A. W. BJORNSTAD.
MAP.
APPLICATION FILED MAR. 13, 1916.
1,213,064.
Patented Jan. 16, 1917.
3 SHEETS—SHEET 3.
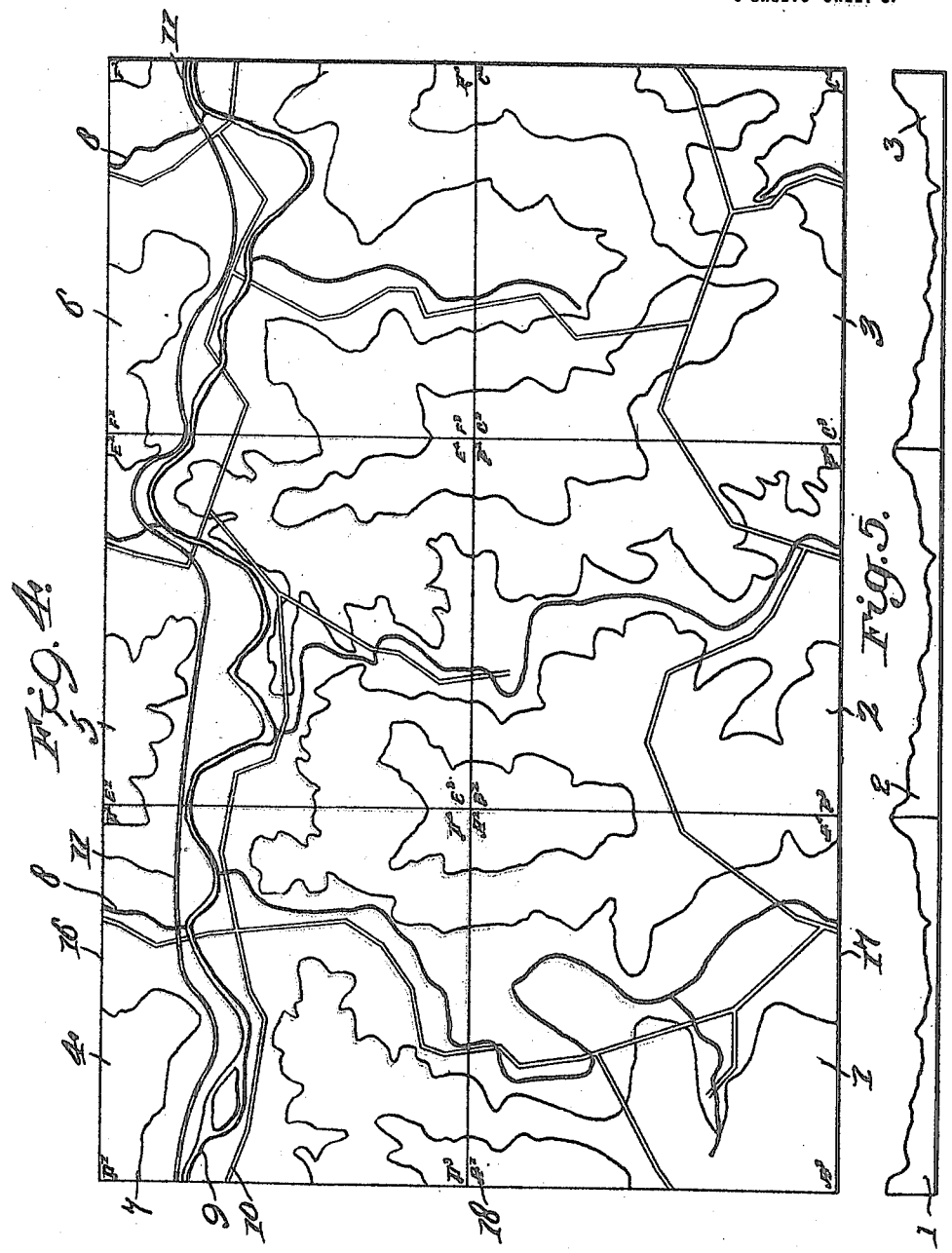

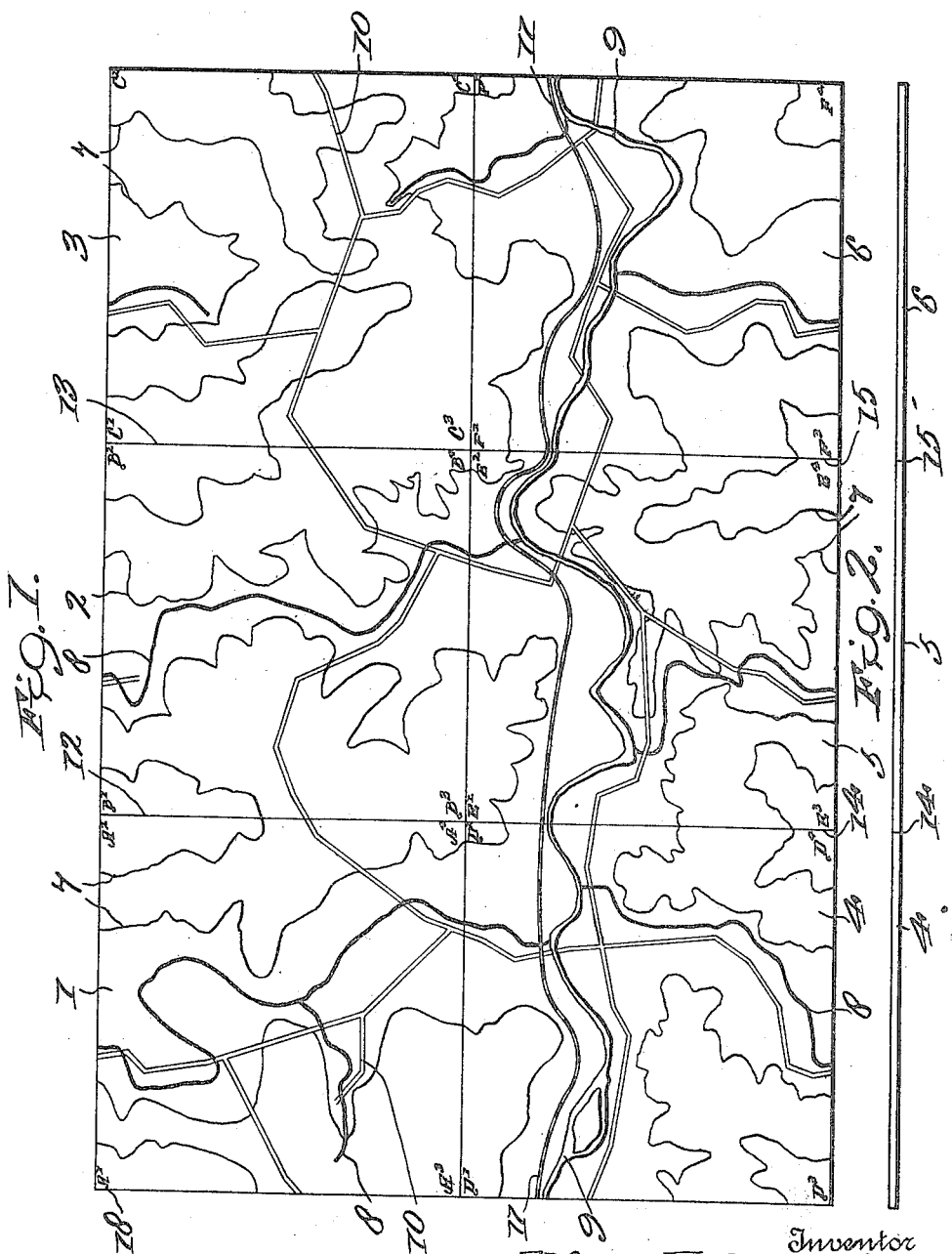

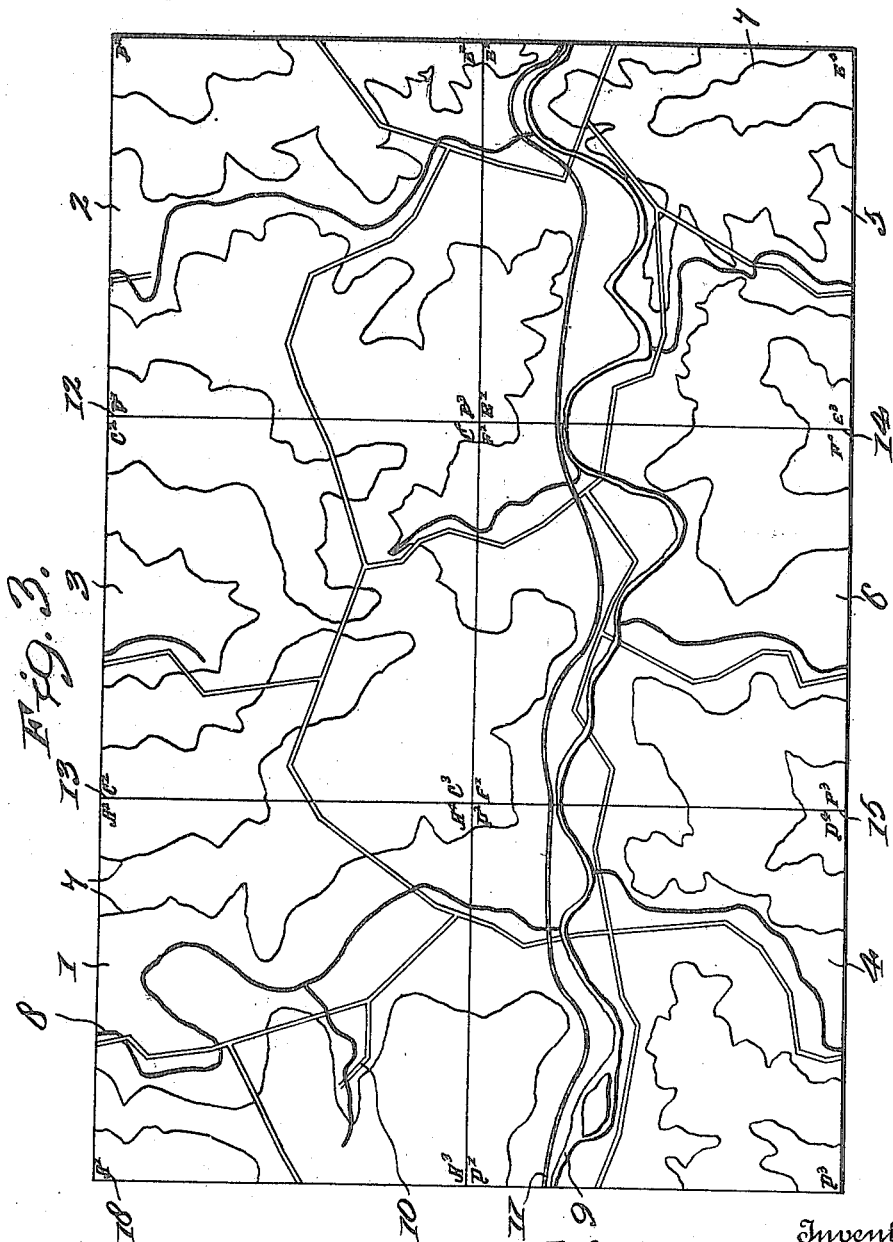

UNITED STATES PATENT OFFICE.

ALFRED W. BJORNSTAD, OF THE UNITED STATES ARMY.

MAP.

1,213,064. Specification of Letters Patent. Patented Jan. 16, 1917.

Application filed March 13, 1916. Serial No. 83,857.

*To all whom it may concern:*

Be it known that I, ALFRED W. BJORNSTAD, captain, United States Army, a citizen of the United States, stationed at Fort Leavenworth, in the county of Leavenworth and State of Kansas, have invented certain new and useful Improvements in Maps; and I do hereby declare the following to be a full, clear, and exact description of the invention, such as will enable others skilled in the art to which it appertains to make and use the same.

The present invention relates generally to improvements in maps, and more particularly to an improved map designed especially for use in military instruction, as for drilling the student in the art of maneuvering, tactics and strategy; the invention being also of special usefulness in instruction in topography and so-called topographic sketching or hasty map making by simple methods, as practised in the military service.

Broadly stated, the present invention conceives the provision of a map composed of a plurality of sections on which are delineated various formations of ground or topography, and being produced with certain or all edges thereof identical in profile to permit of such sections being combined in different groups and arrangements thereby affording a large variety of terrain with few map sections, which can be packed together in small compass for convenient transportation. This study has been heretofore pursued under the disadvantage of the student becoming rapidly familiar with the particular terrain delineated on a fixed and unalterable map; and after he has become so conversant with the ground and topography the student is able to arrive at his conclusions rapidly and without the intermediate mental processes which this study aims to develop, the interest of the student also waning with maneuvering and sketching of well known area.

By the present invention it is aimed to eliminate the above disadvantages with fixed and unalterable maps, as heretofore used, and to maintain the interest of the student keenly alive to his work; and to necessitate close study at all times by providing the map on which the theater of operations is represented in interchangeable sections which may be combined in various groups and arrangements to afford a large variety of terrain.

In the accompanying drawings forming a part of this application, and in which similar reference symbols indicate corresponding parts in the several views, Figure 1 is a plan view of a map constructed in accordance with the present invention and illustrating the sections as grouped in one combination. Fig. 2 is an edge view of the same. Fig. 3 is a plan view of the improved map illustrating a second combination; Fig. 4 is a plan view of the map illustrating a third combination; and Fig. 5 is an edge view of the map showing the parts in profile.

Referring more particularly to the drawings, the improved map may be composed of any number of sections, there being here illustrated six such sections including three upper sections 1, 2 and 3, and three lower sections 4, 5 and 6. The map illustrated as comprised of these sections is arranged to delineate, as a whole, a real or fictitious terrain; the usual symbols, data and indicia being employed such, for instance, as the contour lines 7, tributaries 8, rivers 9, roadway 10, and railroad 11. It is obvious that the map may also contain other representations, as townships and the like, and I do not wish myself understood as restricting the invention to the particular formation of ground or topography illustrated, as the improved map is susceptible of use as representing any given area.

In the drawings the sections composing the map are shown to be square, though it will be understood that the same may be of any other configuration; while the map, as a whole, is disclosed as rectangular. It will be apparent, however, that the various sections may be grouped together in other formations than the rectangular group shown.

Each map section 1, 2, etc., is produced with edges identical in profile, for which compare the vertical edges 12 and 13 of the sections 2 and 3 in Figs. 1 and 3, where the same have been indicated as readily interchangeable to replace the ground formation delineated on the one by the other, and thus shift the general terrain outlined on the whole map. Similarly, the vertical edges 14 and 15 of the sections 5 and 6 are shown to be identical in profile, for which also see Figs. 1 and 3 in which these sections are illustrated to be interchangeable.

Referring now more particularly to Fig. 4, it will be apparent that comparing the combination of the map sections as here grouped with the group in Fig. 1, certain or all of the horizontal edges 16 and 17 of the several sections are identical in profile, permitting of their interchange.

For the purpose of identifying the various sections of the map, and for preserving the record of the combinations of the same which have been heretofore used, each corner of each section is provided with an identifying mark 18, being preferably letters with exponents, such, for instance, as illustrated, $A^1$, $A^2$, $A^3$ and $A^4$ for section 1; $B^1$, $B^2$, etc., for section 2; the letter C being employed for section 3, etc.

It will be understood that the sections 1, 2, 3, etc., may be of any suitable material, and will be of flat or relief form. Such sections will be readily disassembled from the grouped formation illustrated in the drawings, and packed one upon another in small compass for transportation, which is a desirable feature for military students.

It will be at once seen that a map comprising interchangeable sections of the above character may be combined in numerous formations to produce a varied terrain from time to time in order to prevent the student from becoming too familiar with any particular character of ground; and such sections may be multiplied to produce an infinite number of combinations, it being found that by interchanging the pieces of a map of eight sections, while preserving the rectangular formation, the same is susceptible of two thousand combinations or changes. Additional combinations and changes are made possible by grouping the sections in irregular figures.

It is obvious that those skilled in the art may vary the details of construction and arrangements of parts without departing from the spirit of my invention, and therefore I do not wish to be limited to such features except as may be required by the claims.

I claim:—

1. A map composed of sections bearing representations of physical features, the intersections of such representations having the same relative location in a plurality of said sections whereby when the several sections are interchanged a representation on one section will coincide or harmonize with a representation on the adjacent section.

2. A map composed of sections bearing representations of dissimilar physical features, the intersections of such representations having the same relative location in a plurality of edges of said sections whereby the sections are rendered interchangeable to vary the terrain, and, when interchanged the representations on one section will coincide and harmonize with the representations on adjacent sections.

3. A compact map for military instruction including sections bearing representations of physical features, the intersections of such representations having the same relative location in a plurality of said sections whereby, when the several sections are interchanged, a representation on one section will coincide or harmonize with a representation on the adjacent section; and identifying marks on said sections for preserving a record of the combinations used.

In testimony whereof I affix my signature.

ALFRED W. BJORNSTAD.

Copies of this patent may be obtained for five cents each, by addressing the "Commissioner of Patents, Washington, D. C."